INVENTOR
ALFRED CUTAIA
BY Richard H. Smith
ATTORNEY

United States Patent Office

3,509,331
Patented Apr. 28, 1970

3,509,331
SERIAL-BY-DIGIT RECIRCULATING ACCUMULATING REGISTER
Alfred Cutaia, Rochester, Minn., assignor to International Business Machines Corporation, Armonk, N.Y., a corporation of New York
Filed Oct. 24, 1966, Ser. No. 588,931
Int. Cl. G06f 3/02, 7/48
U.S. Cl. 235—176                    6 Claims

ABSTRACT OF THE DISCLOSURE

In a small calculator or computer, a delay line stores data words to be operated upon. Each word has an address-character location and a number of digit-character locations of like order. An arithmetic processor receives the digit characters from storage and other digits from manual amount keys, and combines the two sets of characters serially in accordance with an arithmetic function specified by manual control keys. A single shift register is a common entry point for data from the keys and the processor. An oscillator supplies high-frequency pulses for synchronizing the individual digit bits in the delay line and processor. Another oscillator, activated by depressing the keys, supplies low-frequency pulses for supervising the overall input, arithmetic and output synchronization; its operation is not tied to that of the first oscillator. Initially, address characters are loaded into the delay line at random locations by generating a sequence of address characters, scanning the delay line for empty address locations, and loading the characters into empty locations as they appear. A printer may display the shift register contents for outputting. Plural digit characters in each word may be used to accumulate several results simultaneously, such as minor totals and grand totals.

This invention relates to total accumulation and, more particularly, to a substantially fully electronic total accumulator, capable of both addition and subtraction, such as may be adapted for use in a cash register, desk calculator, small scale computer, or the like.

Most accumulation registers, such as cash registers and desk calculators, which are presently in use, are fully mechanical in nature. This is because of the low cost of mechanical devices of this type. Their inherent low speed is not a problem because their function is limited by the speed of an operator. It has not been until very recently that electronic components for accumulation have become cost competitive with their mechanical counterparts. Once the cost barrier has been overcome, and there is very little doubt that this will occur in the near future when integrated circuits become more readily available, there are distinct advantages to be gained through the use of electronic accumulation registers. Certainly one such advantage is the compactness in size that can be realized due to the microminiature nature of electronic components. Another is reliability of operation and virtual elimination of maintenance. Also, it is entirely conceivable that through the high speed computing capability of electronic circuits, operator speed and efficiency may even be somewhat improved. Still further, electronic accumulation registers are easily adapted to tie in with a central data processing facility, thus enabling "on line" merchandising control through cash registers connected directly into a central processor. Finally, there would appear to be a definite advantage in the "customer appeal" inherent in an electronic cash register due to its quietness of operation and due to the aura of "progressiveness" and extreme reliability which has come to be associated in the public mind with electronic data processing equipment.

It is therefore an object of the present invention to provide an improved accumulation register that is basically electronic in nature.

Another object is to provide a circuit design for an electronic accumulation register that is of low cost due to use of serial storage means and component time-sharing.

Yet another object is to provide an accumulation circuit wherein a plurality of totals to be accumulated are stored and manipulated in accordance with a scheme that is highly flexible to enable virtually any number of different totals to be separately accumulated without an undue increase of circuit components.

In accordance with the invention, a serial storage device such as a delay line or a shift register connected to operate in a recirculating mode provides the basic accumulation storage capacity. Means are provided for the insertion of data into storage on a word-character basis wherein the first character of each word is an address character and the remaining characters of the word represent a digit of each total to be accumulated, each of the digit characters in a word being of like digital order.

A further aspect of the invention lies in the provision of a single auxiliary storage register which serves as the point of entry and exit of all data to and from the accumulation circuits. This is accomplished through time-sharing principles.

Still a further aspect of the invention lies in the use of two separate and independent sources of timing pulses, an "internal" timing generator and an "external" timing generator. The former of these is employed strictly to time the flow of data through the recirculating storage means and arithmetic circuits while the latter is triggered into operation under control of the operator and serves to supervise the basic input, arithmetic and output functions of the system. Tie-in of the two timing generators with each other is strictly on a random basis, thus alleviating hardware which would otherwise be required for full synchronization of the system.

The foregoing and other objects, features and advantages of the invention will be apparent from the following more particular description of a preferred embodiment of the invention, as illustrated in the accompanying drawings.

FIGS. 5a–5i, when taken together in accordance with the arrangement shown in FIG. 6, constitute a schematic diagram of a preferred embodiment of the accumulation register of the invention.

FIG. 6 is a diagram showing the proper arrangement of FIGS. 5a–5i.

FIG. 7 is a diagram illustrating the format of the printed output of the register.

FIG. 8 is a circuit diagram showing one type of bistable latch circuit used in the preferred embodiment.

GENERAL

Figure 1:
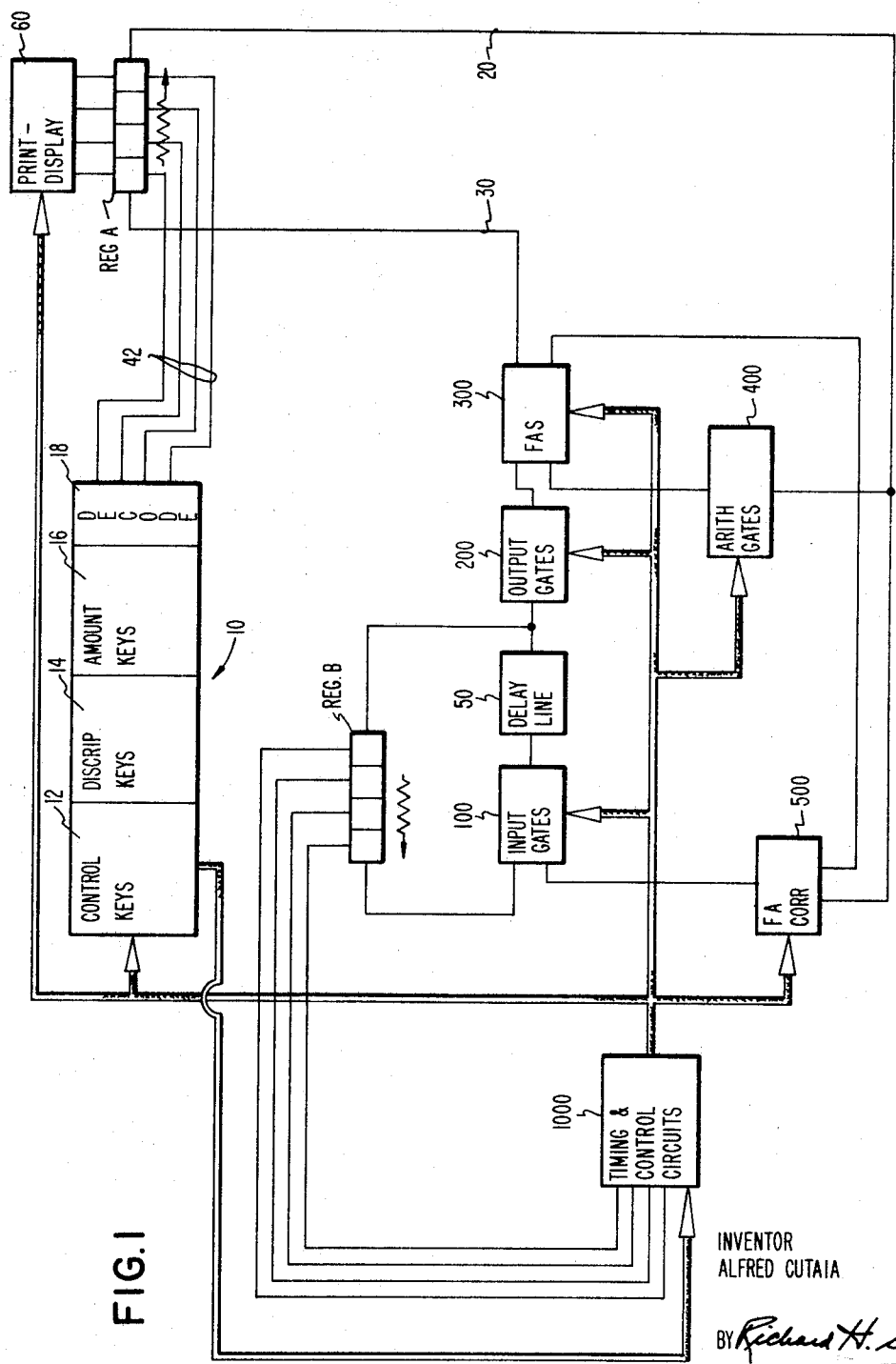
FIG. 1 is a schematic block diagram illustrating the overall arrangement of the system of the invention.

With reference to FIG. 1, the general structure and operation of a preferred embodiment of the invention is hereinafter described. As will become apparent, the illustrated embodiment is oriented to function basically as a cash register. It is to be understood, however, that the basic accumulation function performed by the system is as equally adapted to such devices as desk calculators, small scale computers, etc.

Basic data input and control of the system is accomplished through the keyboard unit 10 comprising a group of control keys 12, description keys 14 and amount keys 16. The keys 12 consist of six operator depressible control keys and two lockable (as with an ignition key) supervisor keys. The six depressible keys control the functions ADD, SUBTRACT, SUBTOTAL, TOTAL, PRINT ONLY and KEYBOARD CLEAR. A first of the lockable keys is a "power on" key which has three positions, off, on, and initial reset. The second lockable key enables readout and reset of the grand total accumulator and has two positions, on and off. The group 14 includes three banks of nine keys each for entering a three digit merchandise identification number. The data from this keybank is supplied only to the printout-display unit 60 for display and recordation and has no effect on the accumulation circuits. The amount group 16 includes five banks of nine keys each for entry of numerical amount digits representative of monetary amounts up to $999.99. A decode circuit 18 converts all manually entered data into an appropriate code for manipulation by the system. As explained in detail subsequently, the basic code employed is binary coded decimal (BCD) with "excess 3" BCD being employed in the arithmetic portions of the system.

All data inputs to be printed or displayed and to be accumulated are transmitted from keyboard decode circuit 18 a digit at a time to a shift register A. These digit character entries are made into this register in a parallel fashion, i.e., broadside. As soon as a digit is entered, print-display unit 60 sets up the appropriate display or print character for subsequent printout or display. Thereafter, the digit character in register A is shifted out of the register to the right and, if it is an amount digit, is transmitted to the accumulation circuits via line 20.

The accumulation circuits include a storage unit, an arithmetic processing unit and a timing and control unit. The storage unit comprises a delay line 50, input gates 100, output gates 200 and a regeneration register B. The arithmeic processing unit comprises a full adder-subtractor (FAS) 300, arithmetic gates 400 and a full adder corrector (FAC) 500. As explained subsequently, the latter is necessitated by the "excess 3" BCD code employed. The timing and control unit 1000 includes an internal timing pulse generator for timing the flow of data through the storage and arithmetic processing units, and an external timing pulse generator which is triggered into operation at the beginning of each transaction cycle by the operator through control keys 12. The latter generator "programs" the overall operation of the storage and arithmetic processing units to effect the function which is called for by the activated control key. Also, the circuit 1000 includes appropriate gating control circuits, as explained in detail subsequently.

Figure 2:
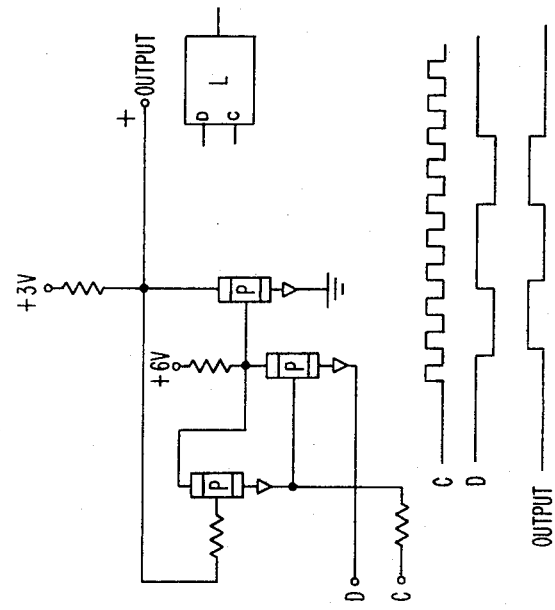
FIG. 2 is a schematic diagram showing the arrangement in which the accumulation totals are stored in the recirculating storage means.

The accumulator storage word-character scheme employed in the recirculating store is illustrated in FIG. 2. Each word is identified by a unique address character positioned, in time, at the beginning of the word. Following each address character is a Minor Total (MT) character, a Grand Total (GT) character and a Space character, arranged in that order. Each character, including the address, comprises four BCD data bits and two space bits, the latter being for timing and control purposes. The MT and GT characters are coded in "excess 3" BCD and the address is straight BCD. The GT and MT characters each represent a digit of an accumulator total and those GT and MT characters in the same word represent digits of like digital order. Thus each word is identified by the digital order of its characters, e.g., the Units word, Tens word, etc. The total number of words in storage indicates the maximum capacity of the accumulators. The Space character does not contain data but is used for timing and control.

Generally, operation of the system is as follows. The power on-initial reset key is unlocked by insertion and turning of a key. This places power into the system, empties the A and B registers and starts the internal timing generator. This latter component continues to issue its timing pulses in an uninterrupted sequence until power is removed from the system. The register is now ready for operation.

On the first merchandise transaction cycle the operator sets up the description keys 14 to identify the item of merchandise being purchased and sets up amount keys 16 in accordance with the price of the item. Next, the operator depresses the ADD control key to register the item. This latter action sets the external timer into operation, which initiates a transaction cycle.

First, the external timer steps the system through an address character loading routine. This occurs only on the first transaction cycle after the register has been turned on. No printing or displaying occurs during this routine. The external timer causes decode circuit 18 to sequentially transmit a unique BCD address character for each of the accumulator storage words, beginning with the Units word first, to register A. As each address character is received in register A, it is transmitted serial-by-bit via line 20 and full adder corrector 500 to the delay line input gates 100 where it is inserted in its proper time slot in the delay line. After an address character for each accumulator word, in the present embodiment there are six words (Units through Hundred Thousands), has been thus written into storage, the external timer is automatically recycled to register the data which is set up on the keyboard.

First, the control keybanks are scanned and decode circuit 18 sets into register A a character representative of the actviated control key (in this case the ADD function). This causes the add symbol to be set up in the print-display unit 60 for recordation and display. Next, the units keybank of amount keys 16 is scanned and decode circuit 18 sets a character representative of the keyed units digit into register A. After this character has been printed and displayed by unit 60, register A is shifted to the right so that the units digit character is transmitted via line 20 to the arithmetic gates 400. At this point the output gates 200 are opened and the MT character of the stored Units word is gated to the full adder-substractor 300 simultaneously with the transmission thereto through arithmetic gates 400 of the digit character coming from register A. The sum of these two digits appears on FAS output line 30 and is gated serially into register A. Of course, since there was no data stored in the MT accumulator, the sum digit character appearing on line 30 is the same as was transmitted from the keyboard. This sum digit character is then shifted to the right out of register A and transmitted to the input gates 100 via full adder corrector 500. The gates 100 insert the sum digit character into the MT position of the Units word in place of the digit character that had previously occupied that position.

Next, the tens keybank of amount keys 16 is scanned and an appropriate digit character is inserted broadside into register A where it sets up print-display unit 60. The character is then shifted to the right out of the register and exactly the same add sequence as just described is performed. Of course, it is the MT character of the Tens accumulator word which is read out of storage, added to the keyboard input character and replaced in storage by the resultant sum digit character appearing on line 30.

This same sequence occurs for each of the remaining keyboard amount digits, hundreds, thousands, and ten thousands. After the ten thousands keyboard digit has been added into the MT accumulator, the external timer causes the arithmetic processing unit to operate through one more cycle so that the carry or borrow set up from the previous operation on the ten thousands digit is added into the MT position of the Hundred Thousands accumulator word.

Next, the description keys 14 are scanned a digit at a time and appropriate digit characters are entered into register A. As each character enters the register it causes a corresponding symbol to be set up in the print-display unit and is then shifted to the right out of the register, emptying the register. Of course, these characters do not affect the storage or arithmetic processing units since the arithmetic gates 400 and input gates 100 are closed at this time.

After all the description digits have been printed and displayed, the transaction cycle is complete and the external timer is arrested. To register the next item purchased by the same customer, the operator once again sets up the description and amount keys and depresses either the ADD or SUBTRACT key, depending upon the particular arithmetic function desired. The above-described transaction cycle is repeated by the system and the MT accumulator is increased or decreased by the amount set up on amount keys 16.

When all the items constituting a sale have been registered, the operator activates either the SUBTOTAL or TOTAL key to initiate readout, display and recordation of the MT accumulator. The external timer causes output gates 200 to open at the proper times to cause the digit characters of the MT accumulator to be gated through FAS 300 into register A a digit at a time, beginning with the units digit first. When each digit is loaded nto register A, the unit 60 sets up the corresponding character for print-display. On subtotal operations the character is shifted out of register A, through FAC 500 and back into its proper slot in storage through input gates 100. On total operations, this re-insertion function is inhibited, as well as the regeneration function through register B, and thus the MT accumulator digits are destroyed, emptying the MT accumulator so that it is ready for the next sales transaction. On a total operation, however, the MT digit characters are shifted out of register A and through arithmetic gates 400 to the full adder-subtractor where they are added to the corresponding order digits of the grand total (GT) accumulator, simultaneously gated, under control of the external timer, from storage through output gates 200. The resulting sum digit character on line 30 is shifted through register A and the full adder corrector 500 and is inserted into the recirculating storage in place of the previous GT accumulator digit. In this way the GT accumulator is increased by the amount of the previous transaction total.

To readout and display the GT accumulator, the grand total readout key is unlocked by the supervisory operator and the TOTAL key is activated. This causes the characters of the GT accumulator to be gated through output gates 200 a digit at a time, units digit first. As each digit character is set into register A, the proper print-display symbol is set up in unit 60 and print/displayed. Thereafter, the digit character is shifted out of register A and is destroyed, emptying the GT accumulator.

Two other control functions provided through control keys 12 in the embodiment described are CLEAR KEYBOARD and PRINT ONLY. The former function allows an operator to restore all depressed amount and description keys before a control key is activated. This enables the operator, upon realization that erroneous keying has taken place, to restore the keyboard so that the item can be re-keyed correctly. The print only function enables recordation and display of amount and description data without activation of the accumulation portion of the system.

DETAILED DESCRIPTION

Referring now to FIGS. 5a–5i, the circuits of a preferred embodiment of the invention are hereinafter described in detail. An understanding of this description will be greatly facilitated if the reader assembles FIGS. 5a–5i, according to the arrangement of FIG. 6 so that they may be referred to as a single drawing.

Keyboard

As shown in FIG. 5, the control keys comprise the six manually operable contact switches ADD, PRINT ONLY, CLEAR, SUBTRACT, TOTAL and SUBTOTAL together with the power on-initial reset key 22 and the grand total accumulator readout key 24. The latter two keys are of the lockable type to permit operation only by selected supervisory personnel. The six depressible keys may be arranged in a single keybank if desired since their operation is mutually exclusive i.e., only one is activated during any single transaction cycle. These keys may be provided with appropriate mechanical detent latch means such as are conventionally employed in cash registers to hold down the key, once it is depressed, until the end of the cycle. Also, additional interlock means may be provided to lock the entire keyboard for the duration of the transaction cycle once any one of the control keys is activated. Sampling and read out to the print-display unit of the control keybanks is accomplished by the six AND gates 28. One of these AND gates is associated with each of the four keys ADD, SUBTRACT, PRINT ONLY and SUBTOTAL and two of the gates 28a and 28b are associated with the TOTAL key. This is due to the fact that in a normal transaction cycle the TOTAL key is used to initiate printout of the MT accumulator and under the supervisor-controlled grand total readout cycle it is used to initiate printout of the GT accumulator. Thus, two separate print symbols are required for the total key. Of course, no print symbol is required for the CLEAR function and thus no sampling gate is associated with the key. The control key print-out data is transmitted to a group of OR circuits 37 and then to decode circuit 18 via the lines 39.

The description keys 14 are arranged in three banks of nine keys each. Each keybank includes a mechanical hold down latch for keeping a depressed key in the bank held down for the duration of the transaction cycle. Also, interlock detents are provided for each bank to permit depression of only one key at a time in any given bank. Sampling AND gates 32 are provided to enable readout of the description key data a bank at a time, beginning with the low-order (right hand) bank first. Each bank, when sampled through its gate 32, causes a signal to issue on one of the nine lines 34 in accordance with the key that is activated. The lines 34, as with the output lines 27 from the control keys, transmit the keyboard input data to the decode circuit 18 via the OR circuits 37.

The amount keys 16 are arranged in five banks of nine keys each, the banks being employed for input of a five digit merchandise amount character. Sampling gates 36 are provided to enable readout of the data from the banks sequentially, one bank at a time beginning with the units (right-hand) bank. Data from these keys are also transmitted to OR's 37 and from there to decode cricuit 18. Gates 36a and 36b are used to set up the decimal point and dollar sign symbol in decode circuits 18 at the proper times during the print-display operation.

Decode circuit 18 receives the inputs on the nine lines 39 and generates a four bit BCD output character on lines 42 which is entered broadside into register A. The lines 42 are individually identified by the numbers 1, 2, 4 and 8 to denote the numerical weight of the data bit transmitted thereon in accordance with the BCD code.

In the present embodiment, circuit 18 produces eighteen different character code combinations on the output lines 42. These combinations represent the ten numerical digits 0 through 9 plus the eight additional symbols ., $, ADD, SUB, TOT, ST, PO and GT. The latter six symbols stand for the six different control key functions of add, subtract, total, subtotal, print only and grand total readout. The BCD code combination employed for each of these symbols is indicated in the following table:

OUTPUT LINES 42

| CHAR | C | 8 | 4 | 2 | 1 |
|---|---|---|---|---|---|
| 0 | 0 | 0 | 0 | 1 | 1 |
| 1 | 0 | 0 | 1 | 0 | 0 |
| 2 | 0 | 0 | 1 | 0 | 1 |
| 3 | 0 | 0 | 1 | 1 | 0 |
| 4 | 0 | 0 | 1 | 1 | 1 |
| 5 | 0 | 1 | 0 | 0 | 0 |
| 6 | 0 | 1 | 0 | 0 | 1 |
| 7 | 0 | 1 | 0 | 1 | 0 |
| 8 | 0 | 1 | 0 | 1 | 1 |
| 9 | 0 | 1 | 1 | 0 | 0 |
| . | 0 | 1 | 1 | 1 | 0 |
| $ | 0 | 1 | 1 | 1 | 1 |
| ADD | 1 | 1 | 0 | 1 | 1 |
| SUB | 1 | 1 | 1 | 0 | 0 |
| TOT | 1 | 1 | 0 | 1 | 0 |
| ST | 1 | 1 | 0 | 0 | 0 |
| PO | 1 | 1 | 0 | 0 | 1 |
| GT | 1 | 0 | 1 | 1 | 1 |

The fifth "C" bit denoted in the table is added in the print-display unit 60 under control of the external timing generator in order to distinguish the six control symbols from the digits 0 through 9. Note that the digits 0 through 9 are coded in "excess 3" BCD which means that the code combination for each digit is derived by adding three to the normal BCD code for that digit. For example, the excess 3 representation of the digit zero is 0011 where it would normally be 0000, etc. Decode circuit 18 also includes AND gates 44 which are employed, as explained subsequently, during the initial address character loading routine to generate the straight BCD digits 1 through 6 which serve as the address characters for the Units through Hundred Thousands accumulator words, respectively. And circuit 46 is included to enable the digit zero to be generated from the keyboard input. This AND circuit is enabled any time that no keys in a keybank are activated. This is necessitated since there is no 0 key on the keyboard.

Timing and control circuits 1000

Still referring to FIG. 5, the timing and control circuits 1000 comprise external timing generator 1100, internal timing generator 1200, cycle control circuit 1300, keyboard gate circuit 1400, reset control circuit 1500, storage access control circuit 1600, print-display buffer control circuit 1700 and add-subtract gate circuit 1800.

Figure 4:
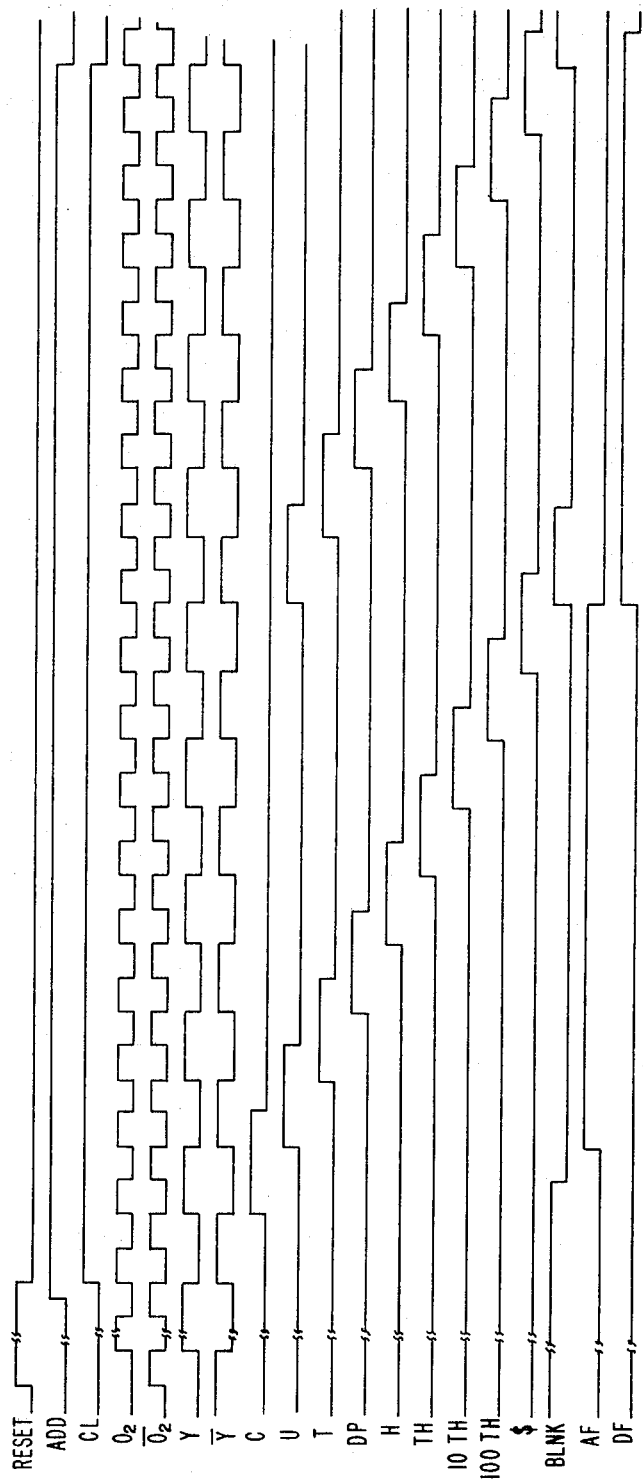
FIG. 4 is a timing diagram depicting the operation of the external timing generator, together with several of its associated control components.
Figure 5A:
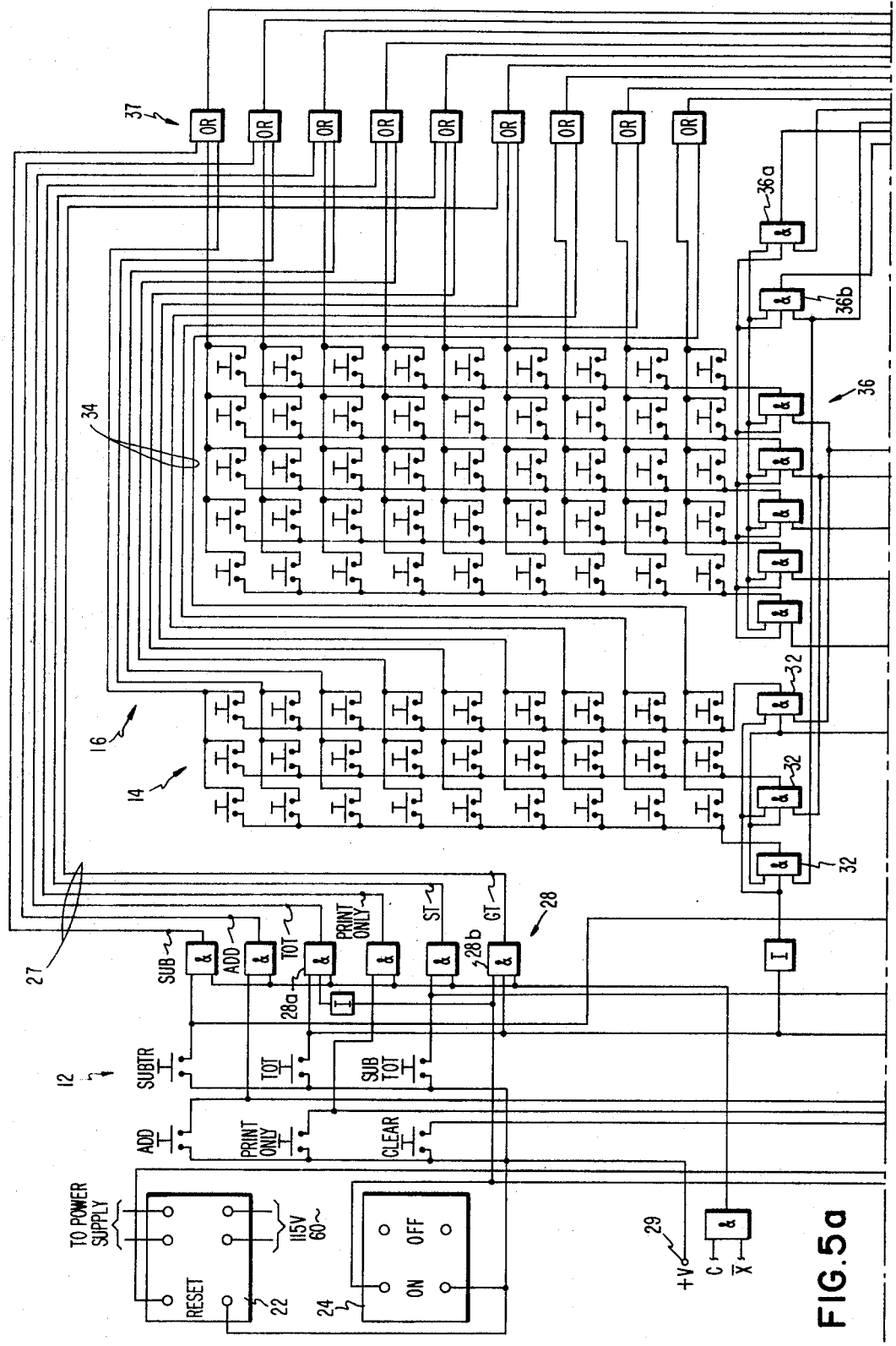
Figure 5B:
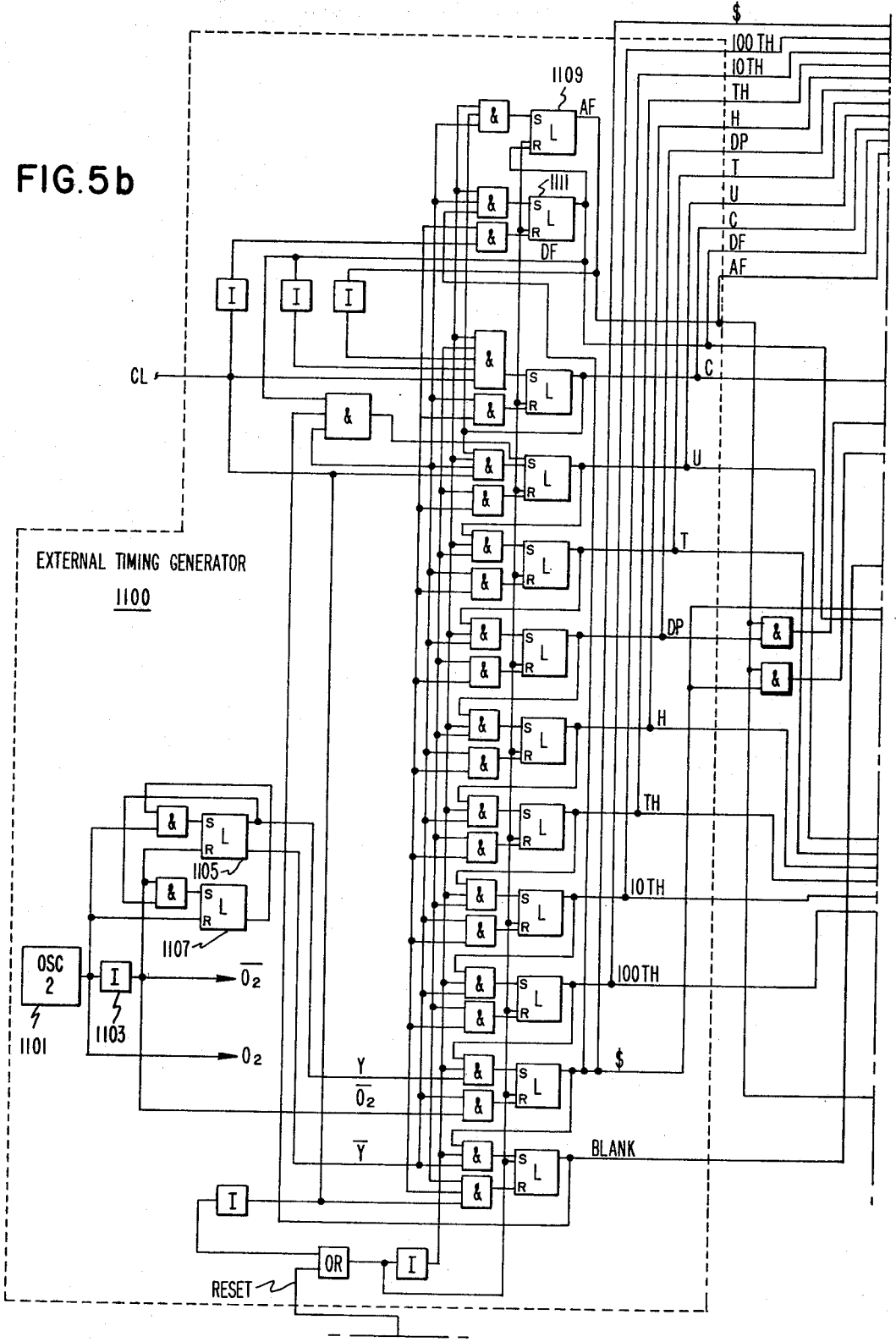
Figure 5C:
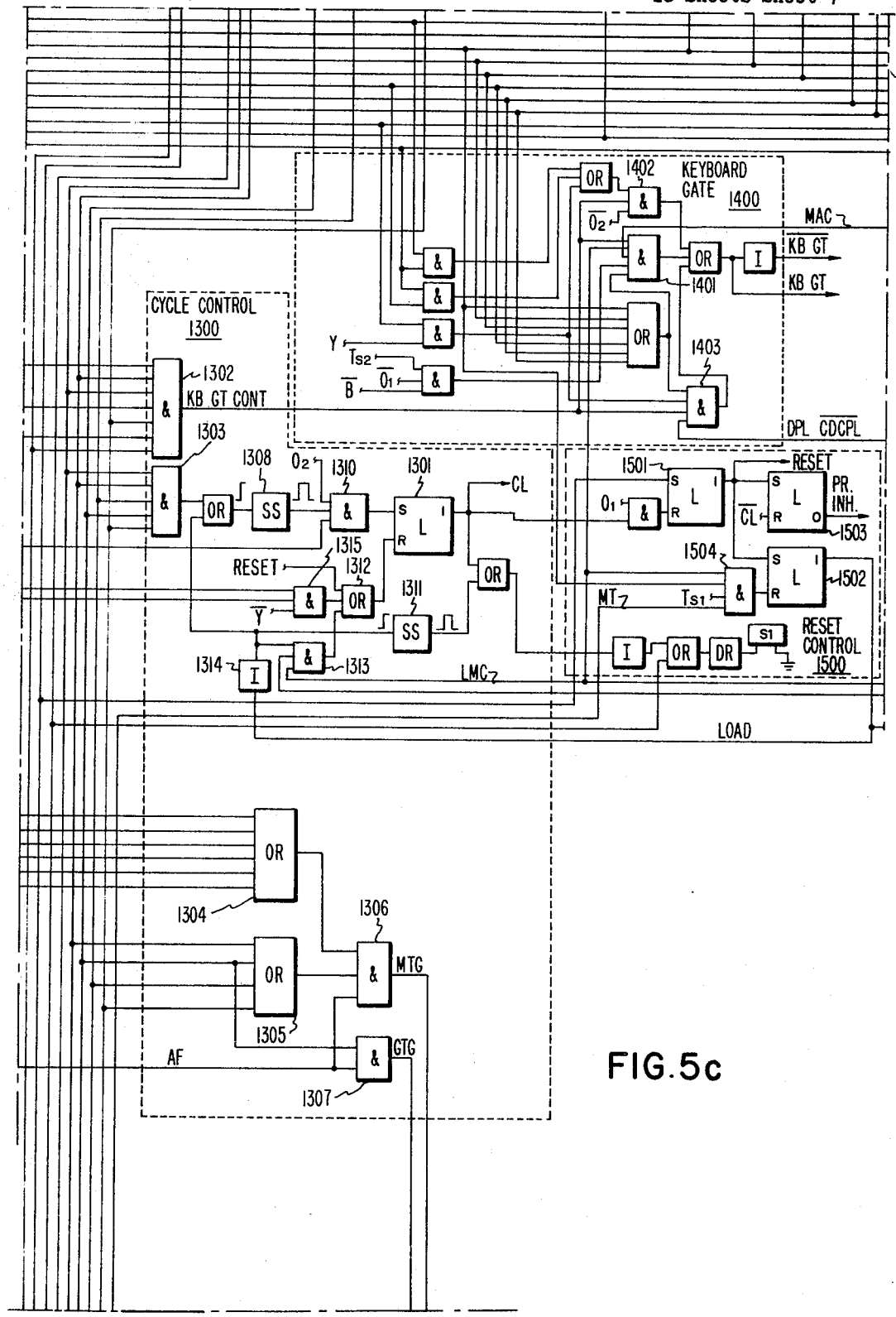
Figure 5D:
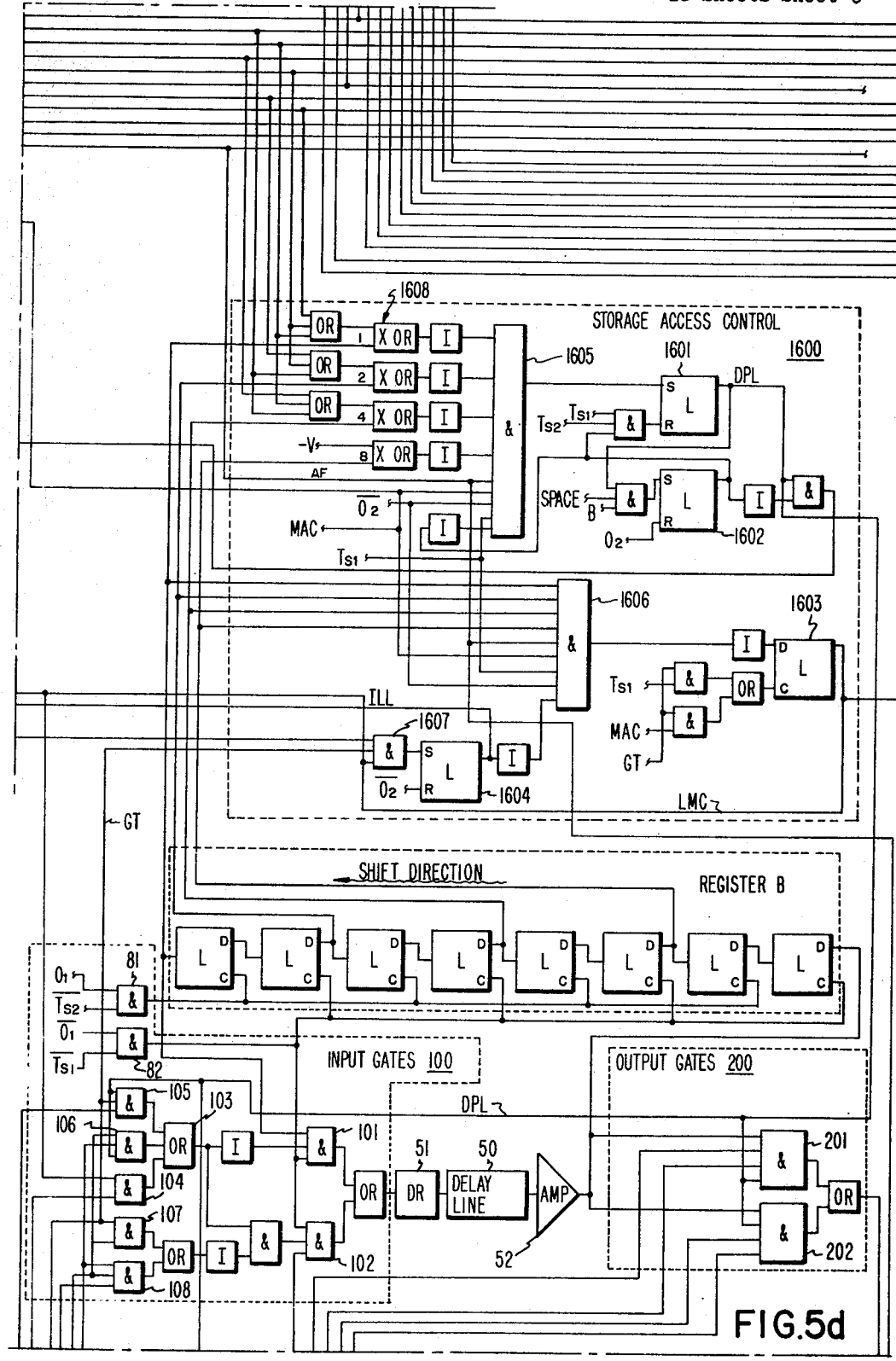
Figure 5E:
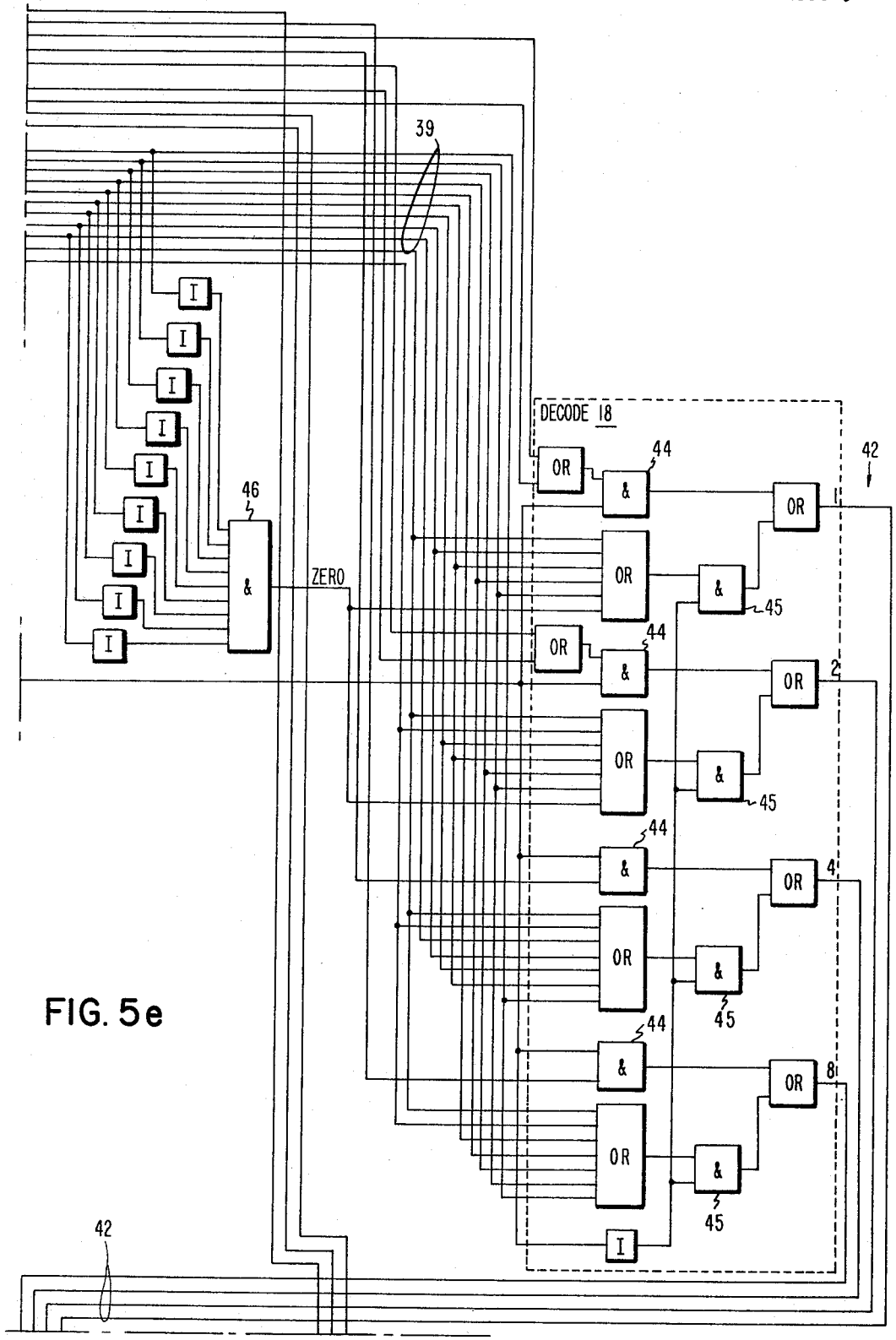
Figure 5F:
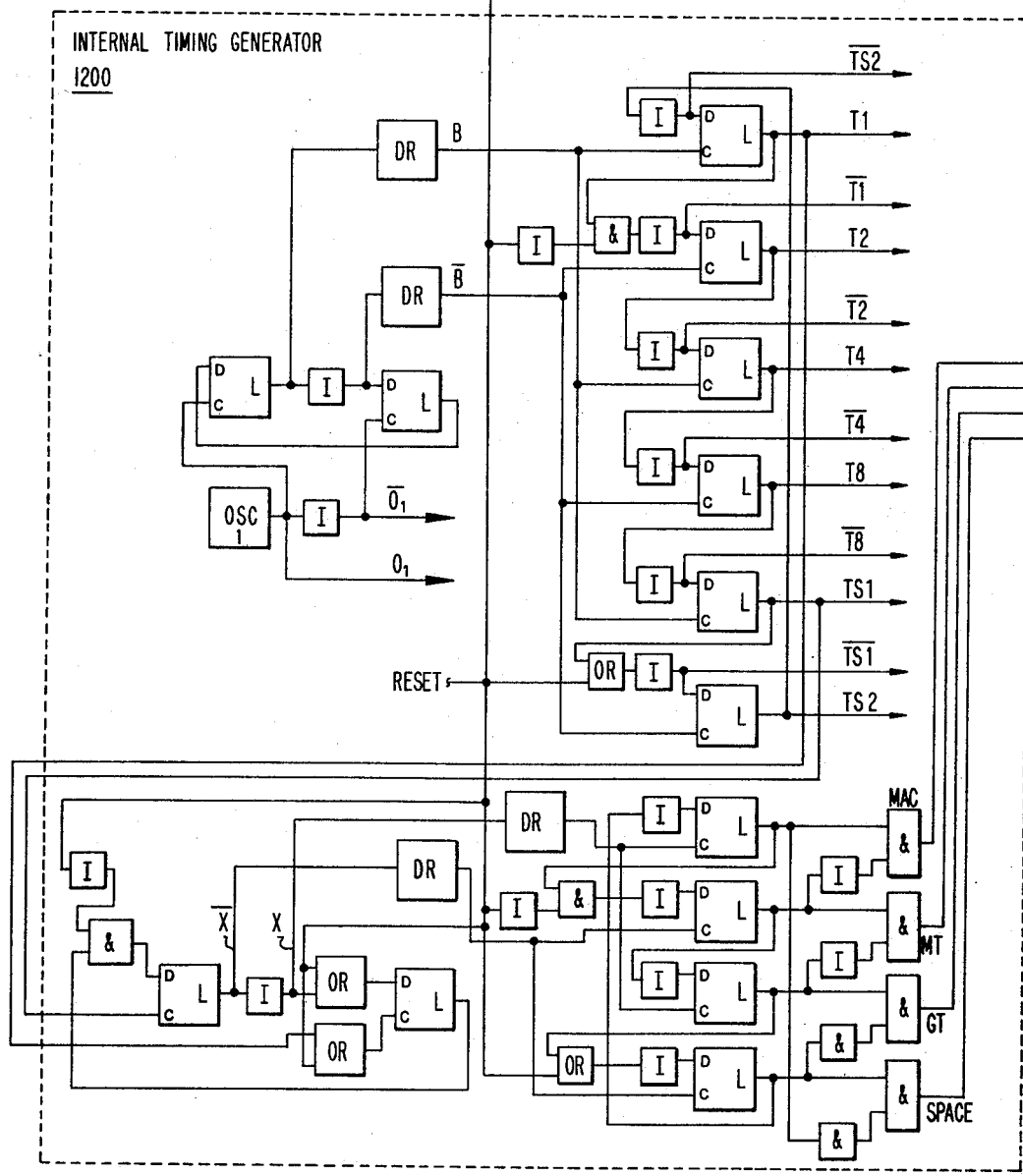
Figure 5G:
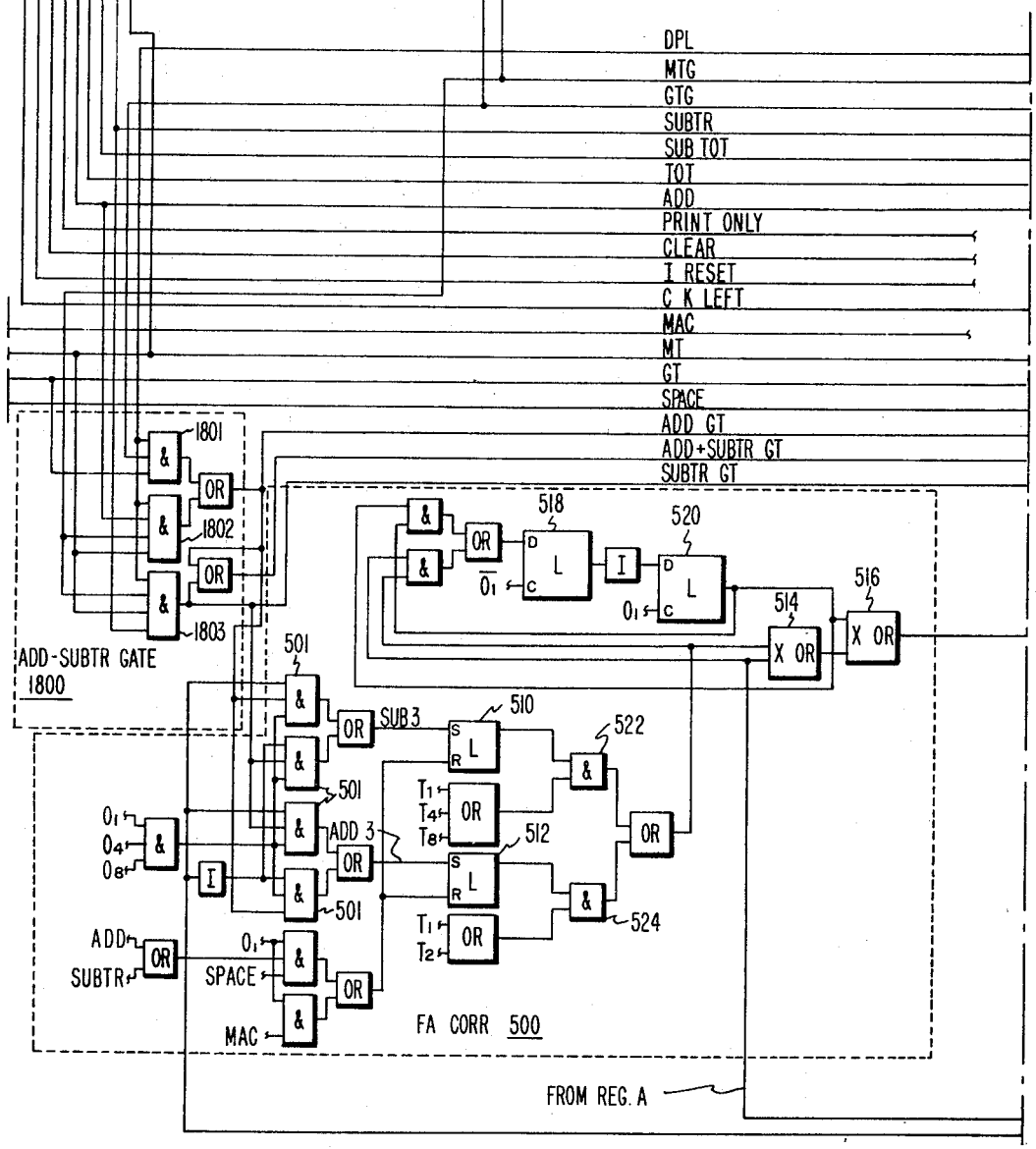
Figure 5H:
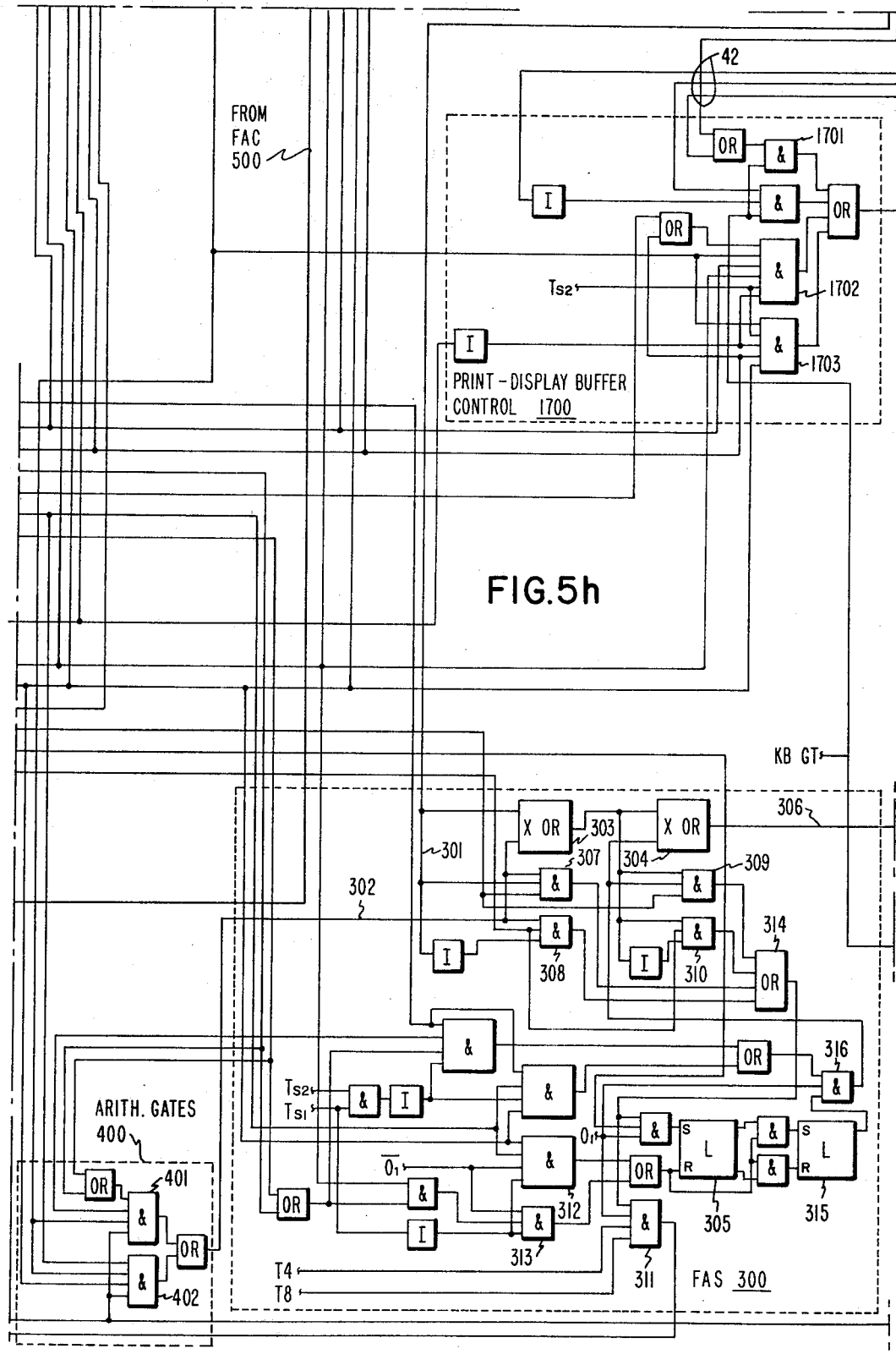
Figure 5I:
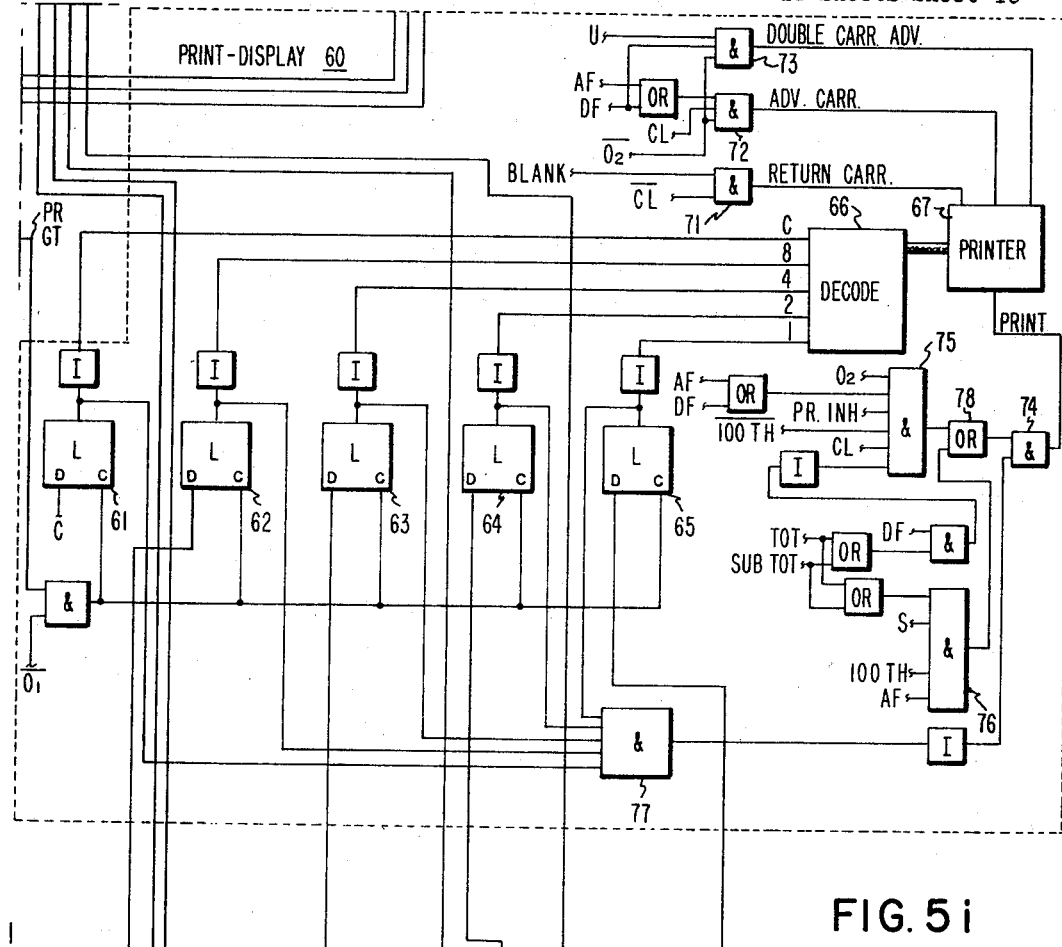

The external timing generator 1100 is essentially a ten position bistable latch ring circuit driven by a two position ring comprising latches 1105 and 1107 which in turn are driven by a constant frequency oscillator OSC 2. The basic output pulses from the ring are denoted C (control), U (units), T (tens), DP (decimal point), H (hundreds), TH (thousands), 10TH (ten thousands), 100TH (hundred thousands), $ and BLANK. The timing sequence of these ten output pulses is shown in FIG. 4. In addition, latches 1109 and 1111 are provided to generate the control pulses AF (amount field) and DF (description field). These signals are also shown in FIG. 4. The oscillator OSC 2 begins operation as soon as power is supplied to the register through activation of the power on-initial reset control key 22. However, as soon as that key is put in the initial reset position, a signal appears on the reset input to the generator 1100 which forces the BLANK latch into a set condition and all of the rest of the output latches into a reset condition, causing the generator to assume the condition indicated at the extreme left of FIG. 4 and to stay that way until the first depressible control key is operated. The generator then issues the sequence of pulses illustrated in FIG. 4. After the BLANK latch has been reset and set for the second time, the sequence of pulses is arrested, meaning that the transaction cycle has been completed and the twelve output signals assume their initial condition and remain in that state until the next time a control key is activated.

The bistable latch circuits schematically indicated in the circuit 1100 are of conventional design, known generally as latches or DC triggers, wherein a positive signal on the set (S) input causes the set output line to go positive and the reset output line to go negative. Conversely, a positive signal on the reset input causes the reset output to go positive and the set output to go negative.

As previously indicated generally and as will be described subsequently in detail, the generator 1100 provides the overall supervisory timing control of all of the register routines.

The internal timing generator 1200 defines the six basic data bit and four basic character times. The six data bit times are denoted T1, T2, T4, T8, TS1 and TS2. The character times are denoted MAC (address character), MT (minor total character), GT (grand total character) and Space (space character). The sequence in which these timing signals issue from the generator or 1200 is illustrated in the timing diagram of FIG. 3. The generator is driven by a constant frequency oscillator OSC 1 which is turned on at the same time as the oscillator OSC 2. It is to be noted, however, that the oscillators OSC 1 and OSC 2 are completely independent of one another, synchronization therebetween being unnecessary. Oscillator OSC 2 has a much lower frequency than OSC 1, the former being operated at the rate of the print-display unit 60, e.g., 20 c.p.s., while the latter is operated at the rate of data bit flow through the recirculating storage register and the arithmetic processing circuits, e.g., 1000 kc. Thus, it is seen that during the period of any single output signal from generator 1100 the total contents stored in the recirculating delay line pass the output gates 200 many times.

The bistable latch circuits schematically illustrated in the timing generator 1200 are known as set-over-reset latches and are somewhat different than the conventional type latch circuit used in generator 1100. The structure operation of a set/reset latch is illustrated in FIG. 8. There, it can be seen that the single output from the latch goes positive each time the control input C is positive while the data input D is negative. The latch circuit is then said to be in its set condition. The output of the latch goes negative, i.e., is reset, whenever both of the inputs C and D are positive. It is to be noted that no change can be induced on the output line unless the C input is positive.

Figure 3:
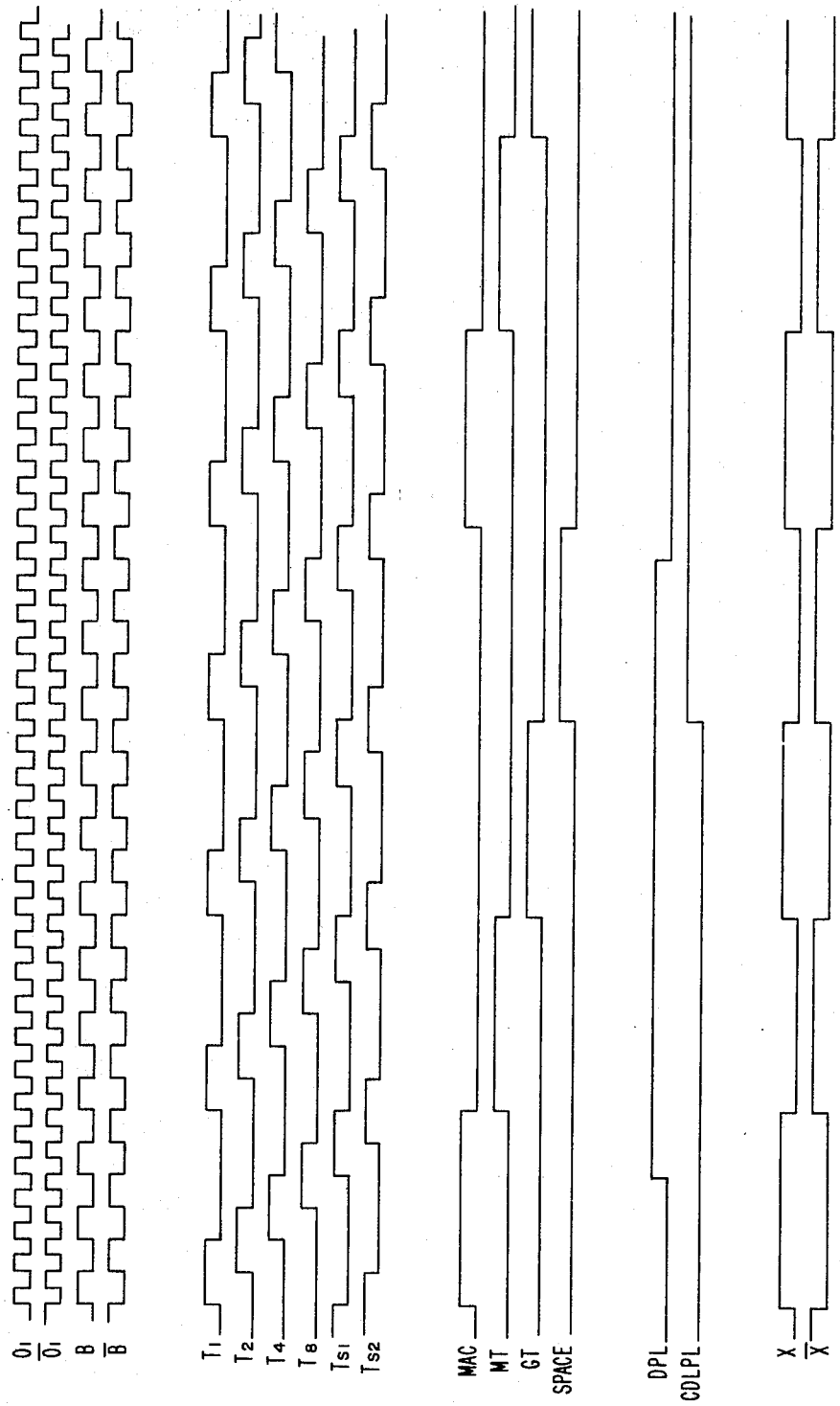
FIG. 3 is a timing diagram depicting the operation of the internal timing generator together with several of the control components associated therewith.

Referring back to FIG. 5, the reset input to the generator 1200 forces the outputs from the T1, TS2, MAC and SPACE latches to go positive while the outputs of all the rest of the latches go negative. This condition remains so long as a positive signal is present on the reset input. Unlike the generator 1100, as soon as the reset signal goes negative, the outputs of the generator 1200 immediately begin cycling through their predetermined sequence (FIG. 3). This sequence is repeated in an uninterrupted manner until power is removed from the machine.

Cycle control circuit 1300 receives input signals from the control keys and from the generator 1100 and produces therefrom the four gate control pulses KB GT CONT, CL, MTG and GTG. The first of these control pulses is generated by OR circuit 1302 in response to receipt of any of its seven indicated input signals. KB GT CONT is used in keyboard gate control circuit 1400 to condition the generation of an output therefrom as explain subsequently. CL is generated from the set output of latch circuit 1301 and is the basic control signal that initiates and arrests the operation of the external generator 1100. Latch 1301 is set by an output from AND 1310, the latter being activated by coincidence of timing signals O2 and BLANK from generator 1100 and an output signal from singleshot multivibrator 1108. The latter is triggered in response to a positive going transition received either from an OR 1303 or from an inverter 1314. OR 1303 produces its output in response to activation of any of the five cycle triggering control keys. Inverter 1314 goes positive only at the end of the address loading routine, which occurs at the beginning of the first transaction cycle after the machine has been turned on. Inverter 1314 thus causes the initial transaction cycle to be a double cycle, i.e., generator 1100 generates two consecutive sequences of output pulses. OR 1312 resets latch 1301 to terminate the transaction cycle. Singleshot 1311 generates an output pulse which inhibits restoration of the keyboard at the completion of the address loading routine.

AND 1306 generates gating signal MTG in response to outputs from OR circuits 1304 and 1305 and an AF timing signal from generator 1100. MTG is employed for conditioning the delay line input and output gates and various gates within the arithmetic processing circuits. GTG is generated by AND 1307 which is conditioned by activation of the TOTAL control key at AF time. GTG is also used for conditioning of delay line input and output gates and arithmetic processing gates.

Keyboard gate circuit 1400 generates an output signal KB GT which gates broadside data entries into register A from the keyboard. KB GT is also used for conditioning the shift control circuits for shifting data out of register A and for conditioning gates in circuit 1700 to control loading of the print-display buffer latches.

Reset control circuit 1500 includes a reset latch 1501 and a load latch 1502. The former is set in response to closure of the reset contacts of the power on-initial reset control key 22. The RESET control signal which is utilized for setting timing generators 1100 and 1200 into their proper initial states is taken from the set output of latch 1501. Load latch 1502 is set when latch 1501 comes on and is reset at the completion of the initial address loading routine. The LOAD output taken from the set side of latch 1502 is used for various gating functions, to be explained subsequently, which occur only during the initial address loading routine. Latch 1503 is provided to prevent operation of the print-display unit 60 during the address loading routine. Also included in the circuit 1500 is a solenoid S1 which actuates the mechanical hold down latches associated with all keybanks of the keyboard, thus effecting restoration of all depressed keys. S1 is activated automatically at the end of each transaction cycle and it may be activated manually by depression of the CLEAR control key.

Storage access control circuit 1600 includes the four latch circuits 1601, 1602, 1603 and 1604. Latch 1603 generates an output signal LMC that indicates that the data in the recirculating storage unit is positioned so that a blank address character occupies the B register. LMC is used to load the address characters into storage. Latch 1604 is set after each address character has been loaded and generates an output signal ILL which inhibits loading of any further data into storage until the next address character has been generated by generator 1100.

Reset latch 1601 is set from an output signal from AND circuit 1605. AND 1605 inspects the B register each $\overline{O2} \cdot TS1 \cdot AF \cdot MAC$ time and generates an output signal when the address character transmitted from the generator 1100 has been located. This sets latch 1601 and generates an output signal DPL. This latter signal is used to control all arithmetic processing operations. The DPL signal stays up until TSL·TS2 occurs following the setting of latch 1602. The latter latch is set at B·SPACE time following the setting of latch 1601. Thus, the DPL signal (see FIG. 3) is up for the duration of substantially one cycle of character timing signals.

Print-display buffer control circuit 1700 generates an output signal PR GT which is utilized to load the five storage latches of the print-display unit 60 with the data stored in register A.

Add-subtract gate circuit 1800 functions to condition the full adder-substractor (FAS) 300 and the full adder corrector (FAC) 500 during the time of the arithmetic processing cycle when the function of those circuits is required.

Delay Line, Delay Line Input Gates 100, Output Gates 200 and Register B

The delay line 50 may be a conventional delay line of the piezo-Wiedemann or magneto-strictive type or it may be a series of cascaded latch or trigger circuits making up a long shift register. Logic signals constituting input data from the input gates 100 are received by driver circuit 51 and placed on the delay line. A pulse-shaping amplifier 52 receives data pulses from the delay line and transmits them to the output gates 200 and to the input of register B.

The input gates 100 and output gates 200 comprise AND and OR logic circuits which are conditioned by timing and gating pulses from circuit 1000 at the proper times for admitting data into storage and gating data out of storage. Input gates 100 include an AND circuit 101 which gates data from regeneration register B back into the delay line. AND gate 102 admits data from FAC 500 into the delay line. AND 102 is opened by a signal from OR 103, the latter signal inhibiting AND 101 through an inverter. Thus, whenever the output of OR 103 is down the data in storage is automatically regenerated from register B. Conversely, when OR 103 is up, the regeneration function is inhibited and new data from FAC 500 is inserted on the delay line in place of the old data.

Register B comprises eight cascaded latch circuits of the type previously described in connection with FIG. 8. AND circuits 81 and 82 cause the data in register B to be shifted to the left at the rate of one latch position per 01 cycle. It is to be noted that AND's 82 and 81 do not operate respectively during TS1 and TS2. Thus, register B is loaded with a character during T1, T2, T4 and T8 while during TS2 of the character time the data is stationary and is available at the register outputs for sampling, readout, etc.

Register A

Register A is identical in construction to register B. However, through the addition of AND gates 83, 84, 85 and 86, register A is adapted to receive data bits from decode circuit 18 in a broadside fashion. Thus, arithmetic input data is loaded into register A in this fashion and transferred to the print buffer latches 62–65 by the occurrence of a KB GT signal from gate 1400 at TS2·MAC time, and is shifted to the right out of register A beginning at T1 of the following (MT) character time. Non-arithmetic data (control symbol, decimal point, dollar sign and description number) is loaded into register A and transferred to the print latches during the control times C, DP, $ and DF.

Arithmetic Gates 400

The arithmetic gates 400 include AND circuits 401 and 402 for gating data from register A to the addend-subtrahend input 302 of FAS 300. AND 401 is conditioned during MT character time and is utilized for passing keyboard input data from register A to FAS 300 simultaneously with the passage by AND 201 of output gates 200 of a digit of the MT accumulator to the augend-minuend input 301 of FAS 300. AND 402 operates to gate, during a total cycle, the updated MT digit from register A to the FAS input 302 simultaneously with the passage by AND 202 of a digit of the GT accumulator to FAS input 301.

Print-Display Unit 60

Print display unit 60 comprises a one character buffer storage register including the latches 61, 62, 63, 64 and 65. These latches are of the type previously described in connection with FIG. 8. Latches 62–65 are loaded with the data bits stored in register A in response to a PR GT signal from control circuit 1700. Latch 61 provides the additional C bit shown on the character code table previously discussed in connection with decode circuit 18. Latch 61 is also loaded at PR GT time. Latches 61-65 supply inputs to a decode circuit 66 which in turn conditions a print unit 67. Printer 67 may be any unit capable of printing or otherwise displaying and recording the eighteen character symbols employed with the present embodiment. For purposes of illustration, printer 67 is herein described as a typewriter-like unit. At the end of each transaction cycle an AND circuit 71 generates a signal which sets the typewriter carriage to the far right-hand margin. Thereafter, each $\overline{O2}$ signal occurring during either AF or DF time after the CL signal has come up causes the carriage to advance one position to the left. AND circuit 72 generates these carriage advance signals. The only exception to this is when the carriage is double spaced just prior to printing the unit digit of the item description number. AND 73 generates the double space control signal.

AND circuit 74 responds at each O2 time to transmit a print-hammer actuating signal to the printer 67. And circuits 75 and 76 feed AND 74 through OR 78. AND 75 operates to generate the print signal for all characters except the 100 thousandths digit character on an accumulator readout operation. AND 76 is provided to generate the print signal at that time. AND 77 operates to inhibit the print signal any time that the outputs of buffer latches 62-65 are all positive, signifying a no-data condition.

FIG. 7 shows the format of the output of printer 67 for a hypothetical customer sale transaction which included the purchase of two items at the prices of $1.79 and $2.40 and which further included a negative cash item (such as discount or returned goods) of $2.20 resulting in a net sales total of $1.99. Note that the purchased and returned or discounted items have the respective merchandise description numbers of 578, 221 and 495.

FAS 300 and FAC 500

The full adder-subtractor 300 and full adder corrector 500 are the portions of the circuit which, under control of add-subtract gate 1800 and appropriate timing pulses, perform the serial arithmetic processing functions which are required for accumulation. FAS 300 includes an augend-minuend input line 301 and an addend-subtrahend input line 302. An exclusive OR circuit 303 performs as a half-adder circuit which generates an output bit in accordance with the well known rules for binary addition and subtraction. Exclusive OR circuit 304 produces the final sum-difference output on FAS output line 306 by adjusting the output of exclusive OR 303 in accord with the carry or borrow bit, stored in latch 315, which was generated from the previous bit-set operation. The sum-difference data bits generated on output line 306 are transmitted directly to the serial input of register A. Carry-borrow bits are generated for storage in latch 315 by AND circuits 307, 308, 309 and 310. AND 311 generates an output signal to FAC 500 representing the carry-borrow bit generated as a result of adding or subtracting the high order (T8) bits of any two digits characters. This bit is also gated into latch 315 and preserved until the beginning of the time period in which the next higher order digit character of the accumulator is processed. Thus, during add and subtract operations, AND 313 prevents latch 315 from being reset until the first $\overline{O1}$ time of the next MT character time after the DPL latch has again been turned on. Similarly, during a total cycle, when the MT accumulator is being added to the GT accumulator, AND 312 prevents latch 315 from being reset until the first $\overline{O1}$ time of the next GT character time after the DPL latch is again set. Latch 305 provides the one bit-time delay necessary for intra-character carry-borrow transfer operation.

FAC 500 is provided to correct each sum digit character generated by FAS 300 before it is inserted into storage. This is necessary because in using "excess 3" BCD code, each sum-difference digit character must be corrected by adding 3 if, in addition, a high order carry bit was generated or if, in subtraction, no high order borrow bit was generated. Further, the sum-difference digit character must be corrected by subtracting 3 if, in addition, no high order carry bit was generated of if, in subtraction, a high order borrow bit was generated. Thus, in the FAS the high order carry-borrow bit generated in processing two digit characters is transmitted by AND 311 to FAC 500 at 01·T4·T8 time. In the FAC 500 this data bit is used to set either an "add 3" latch 512 or a "subtract 3" latch 510. The proper latch 510 or 512 is selected under control of the add-subtract gate circuit 1800 in accordance with the type of arithmetic operation being performed.

When the subtract 3 latch 510 has been set, the sum digit character which is gated from register A to the FAC during the next character time is decreased by 3 as it passes through the full adder circuit comprising exclusive OR's 514 and 516. Set/reset latches 518 and 520 provide the carry transfer function for this full adder. The value of the digit character is decreased by 3 since latch 510 causes binary 1 bits to be gated through AND 522 to the input of exclusive OR 514 during the T1, T4 and T8 bit times. Actually, this amounts to an addition of 13 to the character, but since the high order carry is discarded the result is the same as subtracting 3 from the digit character.

Similarly, to add 3 to a digit character passing through the FAC, latch 512 causes AND 524 to gate binary 1 bits to the input of exclusive OR 514 during each T1 and T2 bit times.

OPERATION

Initial reset and address character loading routine

Referring now to FIGURES 3, 4 and 5, a description of the different operational cycles of the accumulation register is hereinafter given. When a supervisory clerk unlocks control key 22 to place power on the machine and momentarily closes the reset contacts, the I. RESET line is activated and reset latch 1501 is set. This causes timing generators 1100 and 1200 to receive the RESET input which causes the BLANK output of generator 1100 and the T1, TS2, MAC and SPACE outputs of the generator 1200 to be held positive. All other outputs of the two generators are held negative. With the register in this condition, the supervisor removes the key from control key 22, leaving it in the power-on state. This places the register in condition for operation.

The register operator then sets up the first transaction on the keyboard by depressing the appropriate amount and description keys followed by depression of the desired control key. This latter action causes control latch 1301 to be set at the beginning of the first $\overline{O2}$ signal following activation of the key. This resets latch 1501, causing the reset input to the timing generators to go negative. This, coupled with the setting of latch 1301 causes the timing generators 1100 and 1200 to begin to advance through their predetermined cycles.

Since this is the first transaction cycle after power was put on the machine, an address loading routine must be executed. Thus, nothing occurs during C time of generator 1100. When the U and AF signals come up, AND 1606 of the control circuit 1600 samples register B during each MAC delay line character time and causes the output of latch 1603 to be set positive as soon as an empty B register condition is detected. The LMC signal out of latch 1603 activates the four AND gates 44 in decode circuit 1800 to transmit the BCD character 0001 to the 8, 4, 2 and 1 input gates 83, 84, 85 and 86, respectively, of register A. At TS2·$\overline{B}$·$\overline{O1}$ time of the MAC character period, AND 1401 of keyboard gate 1400 causes that circuit to generate a KB GT output signal, causing the AND's 83, 84, 85 and 86 to enter the 0001 address character into the A register. At this time the latches of the A register are conditioned by AND 89 to receive the data.

At the beginning of the next character time (MT) AND circuits 87 and 88 alternately operate to step the address character in register A to the right whereby it is serially transmitted via line 20 through the inactive FAC 500 to the input of AND gate 102 of the input gates 100. Since AND circuit 104 was enabled at the beginning of the MT character time AND 102 is pulsed open at the proper times by driver AND circuit 82 of register B to admit the address character to the delay line in the MAC character "slot." This fixes the position of the Units accumulator word in the storage unit.

At the beginning of the next (GT) character time, AND circuit 1607 sets latch 1604 whereby AND 1606 is inhibited. At TS1 of GT time latch 1603 is reset negative, closing the AND gates 44 and 104.

When generator 1100 advances to the T timing signal the following O2 time, latch 1604 is reset whereby AND 1606 is again conditioned to inspect MAC delay line characters beginning at TS1 time of the next $\overline{O2}$ period. As soon as an empty MAC slot is detected by AND 1606, latch 1603 is again set positive to generate another LMC signal. LMC again operates to open AND circuits 44 and to bring up AND 104 at the beginning of the following MT time. During this portion of the routine AND circuits 44 cause the address character 0010 to be gated to the A register through input gates 83–86. As during the previous portion of the cycle, the address character is shifted out of the A register and onto the delay line through AND gate 102. Once again, AND 1606 is inhibited by the setting of latch 1604 and latch 1603 is again reset negative at TS1 of the following GT character time.

At this time the address characters 0001 and 0010 for the Units and Tens accumulator words have been stored in the delay line. The above-described sequence repeats as each new signal issues from timing generator 1100 so that during DP time the address character 0011 is inserted in the delay line for the Hundreds accumulator word, the character 0100 is inserted for the Thousands accumulator word during H time, 0101 is inserted for the Ten Thousandths accumulator word during TH time and 0110 is inserted for the Hundred Thousandths accumulator word during 10TH time.

At TS1 of the MT character time during the 10TH output from generator 1100, AND 1504 of the reset control circuit 1500 causes load latch 1502 to reset, thus deconditioning AND 1607 so that latch 1604 can no longer become set. This permanently (until the next power-on routine of the machine) inhibits AND 1606 so that those portions of the circuit associated with the address character loading routines are deconditioned. It is to be noted that because of the manner in which the address characters for the accumulator words are stored in the delay line, the accumulator words are not arranged in any particular sequence therein. This is because each time AND 1606 is conditioned to detect the first empty MAC slot in storage, it picks the first empty position to come along. This random manner of addressing the delay line storage unit is carried through in all phases of operation of the accumulation register and is the feature which permits completely independent operation of the two timing generators 1100 and 1200. Thus, the operational sequence of the two timing generators relative to one another is not critical and a hardware saving is achieved through the elimination of the synchronizing components which would otherwise be required to link the two generators. Also, this feature enables extremely low cost components to be employed in the external timing generator since no particular frequency synchronization of stability is required of that device.

Resetting of latch 1502 causes AND 1313 of the cycle control circuit 1300 to be activated and also triggers singleshots 1311 and 1308. Activation of AND 1313 resets latch 1301, causing CL to go negative and causing generator 1100 to be arrested and forced back into its initial starting condition. The positive output of singleshot 1311 inhibits the operation of the keyboard restoring solenoid S1 during this momentary period when the CL signal is down. At the beginning of the next O2 period the positive output signal from singleshot 1308 causes latch 1301 to once again set, whereby another cycle of generator 1100 is triggered to initiate an arithmetic routine, as described below. The output from singleshot 1311 is so timed that it drops soon after latch 1301 has become set. Thus, solenoid S1 remains unenergized until the termination of the second cycle of generator 1100, at which time CL drops and the keys are cleared.

Add-subtract routine

Arithmetic processing routines for updating the MT accumulator are initiated by activation of either the ADD or SUBTRACT key after the appropriate amount and description keys have been set up. Depression of either the ADD or SUBTRACT key triggers singleshot 1308 through OR 1303 and sets latch 1301 to start generator 1100. Of course, as described above, in the initial transaction after power has been placed on the machine an address character loading routine is executed prior to the add or subtract routine. Thus, in that situation a signal from inverter 1314 rather than from OR 1303 triggers singleshot 1308 to start the arithmetic cycle.

At the beginning of the first $\overline{O2}$ signal after the C output of generator 1100 has come up, AND 1402 is energized and KB GT goes positive. Since at this time there is present on output lines 42 from decode circuit 18 a coded representation of either the add or subtract control symbol, in accordance with which of the two keys was depressed, the control symbol character is loaded into register A through AND gates 83–86. At the same time AND 1701 is activated and PR GT goes positive so that the control symbol character in register A sets the print buffer latches 61–65.

During the following O2 signal, the control symbol is printed and is also shifted out of register A so that register is emptied. At this same time the U output from generator 1100 comes up so that a digit character representative of the keyed digit in the units keybank of the amount keyboard 16 is present on output lines 42 of decode circuit 18.

On the ensuing $\overline{O2}$ cycle, the printer carriage advances one position to the right to position the printer for printing the input units digit character. Also, AND 1605 of the storage access control circuit 1600 begins inspecting the B register each TS1 time for the Units accumulator word, which is identified by an address character of 0001. Since at this time the U output from the external timing generator is up, exclusive OR circuits 1608 receive at one set of inputs a code combination representative of the units address character. Thus, when the Units word is located in register B, AND 1605 sets latch 1601 whereby DPL goes positive and AND 1403 causes KB GT to go positive, thus loading the units digit character from the keyboard into register A through gates 83–86. At the same time AND 1701 generates a PR GT signal, loading the units digit character into the print buffer latches.

When DPL went positive at TS1 during the MAC character time, it partially conditioned AND gates 105 and 106 of input circuit 100, AND gates 201 and 202 of output circuit 200, AND gates 1801, 1802, and 1803 of the add-subtract gates 1800 and AND gates 401 and 402 of the arithmetic gating circuit 400. At O1 of the following MT character time the following events occur.

Either AND 1802 or 1803 is activated in accordance with whether the ADD or SUBTRACT key is down. This causes either an ADD GT or SUBTR GT signal together with an ADD GT+SUB GT signal to be transmitted to the FAS 300 and FAC 500, conditioning them to perform the required arithmetic operation. Also, output AND gate 201 opens to gate from storage the T1 bit of the MT character of the Units accumulator word to the augend-minuend input 301 of FAS 300. Also, arithmetic gate 401 opens to gate the T1 bit of the keyboard input digit character in register A to the addend-subtrahend input 302 of the FAS. At this same instant the T1 sum bit appears on output line 306 and the carry-borrow bit which is generated is gated into latch 305.

During the following $\overline{O1}$ cycle the sum bit on line 306 is loaded into the first latch of register A as all data therein is shifted to the right one latch position. Also, the carry-borrow bit stored in latch 305 is transferred to latch 315.

The next O1 pulse causes the T2 bit of the input digit in the A register to be gated through AND 401 to input 302 of the FAS 300 and the T2 bit of the MT character of the Units accumulator word is presented to input line 301. Also, AND 316 is activated to present the carry bit from latch 315 to exclusive OR 304 whereby the T2 sum bit appears on line 306. Also, the carry-borrow bit generated at this time is transferred to latch 305. On the ensuing $\overline{O1}$ cycle the carry-borrow bit is transferred to latch 315 and the T2 sum bit is loaded into register A as the data therein is shifted one latch position to the right.

This process repeats until during the first $\overline{O1}$ cycle during T8 the final (T8) sum bit is loaded into register A and the high order carry-borrow bit generated through processing of the T8 input bits is gated into latch 315. At this time register A contains a digit character representing the sum (or difference) of the keyboard units digit character and the MT digit character of the Units accumulator word. The next O1 signal does not generate an output from AND 313 because of the TS1 input thereto and thus the high order carry-borrow output of latch 315 is preserved until the first O1 cycle of the following digit processing (DPL) cycle.

During the next character time (GT) the new MT units digit stored in register A is shifted to the right therefrom and transmitted through FAC 500, where the required correction is made, and thence to delay line input AND gate 102. AND 102 is conditioned by AND 105 to insert the new MT digit character into the Units accumulator word in place of the MT digit character that had previously occupied that position of storage. Then, at the beginning of the following SPACE character time, latch 1602 is set and shortly thereafter, at TS1·TS2·SPACE time, latch 1601 is reset. This causes DPL to go negative whereby all arithmetic processing circuits are inhibited.

When the T output of the generator 1100 comes up, the above-described add-subtract cycle is repeated, resulting in print-out of the tens keyboard digit and in arithmetic processing of that digit character with the MT digit character of the Tens accumulator word, whereby a new MT digit character is generated and inserted in the delay line storage unit in place of the old.

When the DP output of generator 1100 comes up, latch 1601 is not set since no reference inputs are transmitted to exclusive OR circuits 1608 during the period of the DP output. Thus, since DPL never comes up at this time arithmetic processing does not take place. However, during DP time the decimal point character is loaded into register A and set the print buffer latch 61–65 to enable printout of the decimal point.

During the H, TH and 10TH timing signals, the above-described arithmetic processing routine is resumed and the hundreds, thousands and ten thousands keyboard input digits are printed out and processed with the MT digit character of the Hundreds, Thousands, and Ten Thousands accumulator words, respectively. When the 100TH timing signal comes up, a zero input character, which is generated by AND 46, is gated into register A. However, since AND 75 is inhibited at this time, no character is printed. When $\overline{O2}$ comes up, AND 1605 locates the Hundred Thousandths accumulator word and initiates an arithmetic processing cycle whereby the zero character in register A is added to or subtracted from the MT digit character in the Hundred Thousandths accumulator word. The purpose of this operation is to add the carry-borrow bit generated during operation on the ten thousandths digit and preserved in latch 315 into the hundred thousandths position of the MT. This completes the addition or subtraction of the amount set up on the amount keys to the MT accumulator.

When the dollar sign output of generator 1100 comes up, no arithmetic processing occurs since no reference input is transmitted to exclusive OR's 1608. The dollar sign character symbol is gated into register A and buffer latches 61–65 for printout. After the dollar sign symbol is printed, the printer carriage advances two spaces and generator 1100 reverts back to the U output signal (see FIG. 4). This output signal together with the ensuing T and DP outputs causes printing of the units, tens and hundreds digits, respectively, of the description keys.

During the final H, TH, 10TH, and 100TH output signals from generators 1110, zeros are automatically gated into register A for printout. Thereafter, upon coincidence of the dollar sign timing signal with DF and $\overline{Y}$, AND 1315 is activated to reset control latch 1301. When this occurs CL goes negative, arresting generator 1100 and forcing it back to its initial starting condition, where it is held until the next control key is activated. Also, the dropping of CL energizes solenoid S1 to restore the keyboard. This completes the transaction cycle.

Subtotal-total routines

When the operator energizes the subtotal control key, the MT accumulator total is gated out of the recirculating storage unit a digit at a time into register A so that the print buffer latches 61–65 may be set up and the MT total printed out. Each digit, after it has set up the print latches, is shifted out of register A and back into the recirculating storage unit via FAC 500.

In detail, the operation of the circuits for the subtotal routine is as follows.

When the SUBTOTAL key is activated, latch 1301 is set, bringing up the CL signal whereby generator 1100 is triggered to initiate the cycle. When the C output from generator 1100 comes up, the code combination which is representative of the control signal ST is gated into register A and the print buffer latches for printout. Next, after the U signal comes up, AND 1605 begins searching for the Units accumulator word at $\overline{O2}$ time. When this word is located, latch 1601 is set and DPL goes positive whereby input AND gates 105 and 106, output AND gates 201 and 202, and AND gates 1702 and 1703 are partially conditioned. Note, however, that during the subtotal cycle no output signals are generated from add-subtract gating circuit 1800 and all arithmetic processing is inhibited during this time.

At MT character time after DPL comes up, AND 201 is opened to admit the MT digit character of the Units accumulator word to input 301 of FAS 300. Since the FAS is not conditioned to operate at this time and since the arithmetic gates 400 are closed, the digit character is gated through exclusive OR's 303 and 304 unchanged and is stored serial-by-bit in register A. At TS2 of MT time, the MT digit character is in register A and AND 1702 is enabled, causing a PR GT output signal to issue from circuit 1700. This signal loads buffer latches 61–65 with the digit character, enabling printout thereof during the following O2 cycle. Beginning at T1 of the ensuing GT character time, the digit in register A is shifted serial-by-bit back to input AND gate 102 via FAC 500. The character passes unmodified through the circuit 500 since that circuit is inactive at this time (no correction being required). AND circuit 105 enables the digit to be gated through AND 102 and onto the delay line in the same storage position which it previously occupied.

When the T output of generator 1100 comes up the MT digit character of the Tens accumulator word undergoes the above-described process whereby it is printed out and re-inserted in the recirculating storage unit. At DP time no data is gated out of the storage unit and a decimal point is printed. At H, TH, 10TH and 100TH times, the MT digit characters of the Hundreds, Thousands, Ten Thousands and Hundred Thousandths accumulator words, respectively, are gated out of the recirculating storage unit and into register A for printout and then back to their previous storage unit and into register A for printout and then back to their previous storage positions in the delay line. After the MT character of the Hundred Thousandths accumulator word has been printed out and gated back to storage, the dollar sign symbol is printed, ending the subtotal operation. As the external timing generator steps through its final series of output pulses, both AND circuits 75 and 76 are inhibited and thus printing does not occur. When generator 1100 arrives at its final condition of $\cdot DF \cdot \overline{Y}$, control latch 1301 is reset whereby CL drops and generator 1100 is arrested and restored to its initial condition. Zeroes to the left of the most significant digit of the MT accumulator word are automatically suppressed by AND circuit 77.

The total cycle also results in printout of the MT accumulator total. However, the digits of the MT accumulator total are not gated back into the storage unit but instead are added to the corresponding digits of the grand total (GT) accumulator total. Only the sum digit resulting from this addition operation is gated back into the storage unit.

In detail, the operation of the circuits for the total routine is as follows.

The routine is triggered when the operator activates the TOTAL key whereby control latch 1301 is set and generator 1100 is turned on. When the C signal comes up, AND 28a is activated to set the TOT digit character into register A from decode circuit 18 to enable printing of the TOT symbol. When the U signal comes up, AND 1605 locates the Units accumulator word and sets latch 1601. This causes output AND circuit 201 to gate out the MT digit character of the Units word for transmission to the A register. At TS2 of MT character time, the print buffer latches are loaded with the digit character to enable printout.

At the beginning of the ensuing GT character time, input AND gate 107 is activated to inhibit AND gate 102, thus preventing re-insertion of the MT digit character back into the delay line. However, at the same time output AND gate 202 and arithmetic AND gate 402 opened to admit, respectively, the GT character from the Units accumulator word and the MT character in register A simultaneously into FAS 300. Also, at the beginning of the GT character time, AND 1801 of the Add-Subtract Gate 1800 was energized, generating output signals on the ADD GT and ADD GT+SUB GT output lines to the FAC 500 and FAS 300. Thus, as the GT and MT digit character bits propagate through FAS 300 they are added and a GT sum digit character is inserted serially into register A.

At T1 of the ensuing SPACE character time, the GT sum digit character is shifted out of register A, corrected in FAC 500 and inserted into the delay line storage unit via input gate 102. It is the output from AND 106 that conditions AND 102 for this entry operation.

After the GT sum digit has been thus inserted in the delay line in place of the previous GT digit character of the Units accumulator word, latch 1601 is reset and the DPL signal drops, inhibiting any further operation of the accumulation circuitry for the duration of the $\overline{02}$ portion of the U output signal from generator 1100.

When the T output from generator 1100 comes up, the MT digit character of the Tens accumulator word is gated out of storage and into register A for printout and is thereafter added to the GT digit character of the Tens accumulator word in the manner described above. The GT sum digit character is gated from register A, corrected and inserted into storage through AND gate 102 in place of the previous GT character of the Tens word. During the DP timing signal no arithmetic processing occurs and a decimal point symbol is printed. Thereafter, during the H, TH, 10TH, and 100TH timing signals, the Hundreds, Thousandths, Ten Thousandths and Hundred Thousandths accumulator words are addressed and the MT digit character of each is gated out of storage, printed and added to the corresponding GT digit character. After each such addition, the GT sum digit character is inserted in the delay line to take the place of the previous GT character of that word.

After the dollar sign symbol has been printed, the printer is inhibited for the duration of the cycle of generator 1100, as above described for the subtotal cycle. Thus, at the completion of the total routine the MT total has been reset to zero and the GT total updated by the amount of the MT total.

Grand total readout routine

The grand total readout routine enables a supervisory operator, by unlocking control key 24, to cause print out of the GT accumulator. At the same time, the GT accumulator is reset to zero.

Operation of the circuits for the grand total readout routine is as follows.

The supervisory operator unlocks control key 24 and turns it to its on position. Thereafter, the operator activates the TOTAL key to set control latch 1301, turning on generator 1100 and initiating the cycle. At C time AND gate 28b is enabled and the code combination representative of the control symbol GT is generated on output lines 42 of the decode circuit 18. The ensuing O2 signal causes AND 1402 to bring KB GT up whereby the GT character is loaded into register A and transferred to the print buffer latches for printout.

At U time AND 1605 is conditioned to locate the Units accumulator word. When that word is located, latch 1601 is set and DPL comes up. This partially conditions output AND gate 202 and buffer control AND gate 1703. During the following GT character time, AND 202 transmits the GT digit character of the Units accumulator word to register A through FAS 300. At TS2, AND 1703 causes PR GT to go positive, loading the GT digit character into the print buffer latches whereupon, on the following O2 cycle it is printed out. During the following SPACE character time, the GT digit character is shifted out of register A and destroyed, causing the GT digit character of the Units accumulator word to be reset to zero. This occurs since input AND circuit 108 is activated to decondition regeneration AND gate 101. Thus, no data is gated back into the delay line at this time and it is thus reset to zero. Also, arithmetic AND gate 402 is deconditioned during SPACE character time to prevent the recirculation of the GT digit through FAS 300 and back into register A.

When the T output from generator 1100 goes positive, the above-described sequence of operations is performed on the GT digit character of the Tens accumulator word. This causes that digit character to be printed out and destroyed.

After the decimal point is printed at DP time, the hundreds, thousands, ten thousands, and hundred thousands accumulator words are addressed in that order and the GT digit characters thereof are gated out of storage and into register A for printout and subsequent erasure. After the dollar sign symbol is printed out the cycle is complete. As with the total and subtotal routines, printing is inhibited during the DF portion of the cycle of generator 1100. It is to be noted that the only data left in the recirculating storage unit at this time is the address character data.

Print-only routine

The print-only routine permits the operator to print out any desired amount and description digits set up on keyboards 14 and 16. The arithmetic processing circuits are not activated during this routine so that total accumulation is not performed.

Operation of the circuits for the print-only routine is as follows.

The operator sets up the amount and description keys with the desired data and then activates the PRINT ONLY key. This sets latch 1301 and thus initiates operation of generator 1100. At C time the PO digit character is loaded into register A whereupon it is transferred to the print buffer latches and printed out.

At U time, AND 1605 addresses register B and sets latch 1601 when it locates the units accumulator word. This causes DPL to go positive whereby AND 1403 generates a KB GT signal to cause loading of the units digit of the amount keyboard into register A whereupon it is transferred to the print buffer latches and printed out. It is to be noted that even though the DPL signal came up, none of the AND circuits of input gates 100, output gates 200 or add-subtract gate 1800 was activated. This prevents operation of the arithmetic processing circuits.

At T time this cycle is repeated and the tens digit of keyboard 16 is loaded into register A and printed out. As generator 1100 steps through the remaining portion of its cycle, the decimal point and hundreds, thousands and ten thousands keyboard digits are loaded into register A and printed out followed by similar manipulation of the dollar sign and description keyboard digits. After the last description digit has been printed out, the transaction cycle terminates with restoration of the keyboard, as previously described.

SUMMARY

As is apparent from the above detailed description of the acumulating register of the present invention, modification of the circuits to increase or decrease the digit capacity of the accumulator words or to increase the number of totals accumulated would be a fairly simple matter, requiring only minor hardware additions. For example, to increase the number of digits in each of the accumulators would simply require provision for a larger number of accumulator words in the recirculating storage with an appropriate number of positions added to the external timing generator. To increase the number of totals accumulated, additional characters would have to be added to each accumulator word. This in turn would require appropriate expansion of the character time generating circuits of the internal timing generator.

Also, some circuit modifications would be required to enable arithmetic processing of more than one accumulator total in one arithmetic processing cycle. For example, since the addition of any stored digit character with the keyboard imput character requires that the keyboard character be inserted in register A at the end of the character time immediately preceding the time that the desired digit character is available at output gates 200, at least one character time period must separate each of the digit characters of an accumulator word which are to be individually added to the input digit in a single cycle. An alternative to this would be to keep the latch 1601 set for two or more cycles of the character time generator rather than one as in the described embodiment.

While the invention has ben particularly shown and described with reference to a preferred embodiment thereof, it will be understood by those skilled in the art that the foregoing and other changes in form and details may be made therein without departing from the spirit and scope of the invention.

I claim:

1. In a serial calculator, the combination comprising:
    recirculating storage means for storing a plurality of data words, each said word having a plurality of individual bits and being adapted to contain an address character at an address location and an associated digit character at a digit location within said word;
    first timing means generating a first set of periodic pulses and coupled to said storage means for synchronizing the circulation of said individual bits with respect to said pulses;
    a manually operable keyboard having a set of control keys for selectively specifying one of a plurality of arithmetic functions;
    arithmetic processing means coupled to said control keys and to said storage means for performing said specified one of said functions upon a plurality of said digit characters and for producing a serial output representation therefrom;
    second timing means, independent of said first timing means, coupled to said control keys and therethrough to said processing means, said second timing means being operable to produce a second set of pulses for synchronizing the performance of said specified function by said processor;
    generating means coupled to said second timing means for generating a sequence of different address characters in response to said second set of pulses;
    scanning means coupled to said storage means for scanning said address location of each said data word and for producing detection signals representative of empty ones of said address locations; and
    input gating means coupled to said first timing means, said generating means and said scanning means for entering said sequence of different address characters into respective ones of said empty address locations in response to said detection signals and in synchrony with said first set of pulses.

2. A serial calculator according to claim 1, wherein said manually operable keyboard further comprises a set of amount keys for specifying a plurality of digit representations, and wherein said arithmetic processing means is further coupled to said amount keys for combining said digit representations with said plurality of digit characters in accordance with said specified function.

3. A serial calculator according to claim 2 wherein said amount keys are further coupled to said second timing means for producing said digit representations in synchrony with said second set of pulses.

4. A serial calculator according to claim 2 wherein said storage means includes regeneration means coupled to said input gating means for recirculating said data words therein, and wherein said arithmetic processing means and said second timing means are coupled to said gating means for interrupting said regeneration means and for introducing said serial output representation into said storage means in response to predetermined ones of said second set of pulses.

5. A serial calculator according to claim 4, further comprising:
    a storage register coupled to said keyboard and to said processing means for storing said digit representations and said serial output representation;
    arithmetic gating means coupled to said storage register, to said processing means and to said second timing means for gating the contents of said storage register into said processing means in response to preselected ones of said second set of pulses; and
    further gating means coupled to said storage register, to said input gating means and to said second timing means for gating the contents of said storage register into said input gating means in response to further preselected ones of said second set of pulses.

6. A serial calculator according to claim 5, further comprising printing means coupled to said shift register and to said second timing means for displaying the contents of said storage register in response to preselected ones of said second set of pulses.

References Cited

UNITED STATES PATENTS

| | | | |
|---|---|---|---|
| 3,304,418 | 2/1967 | Perotto | 235—159 X |
| 3,083,910 | 4/1963 | Berkin | 235—153 |
| 3,023,963 | 3/1962 | Schmitt et al. | 235—176 |
| 3,330,947 | 7/1967 | Alpert et al. | 235—176 |

MALCOLM A. MORRISON, Primary Examiner

DAVID H. MALZAHN, Assistant Examiner

U.S. Cl. X.R.

235—159, 167